United States Patent Office 2,801,463
Patented Aug. 6, 1957

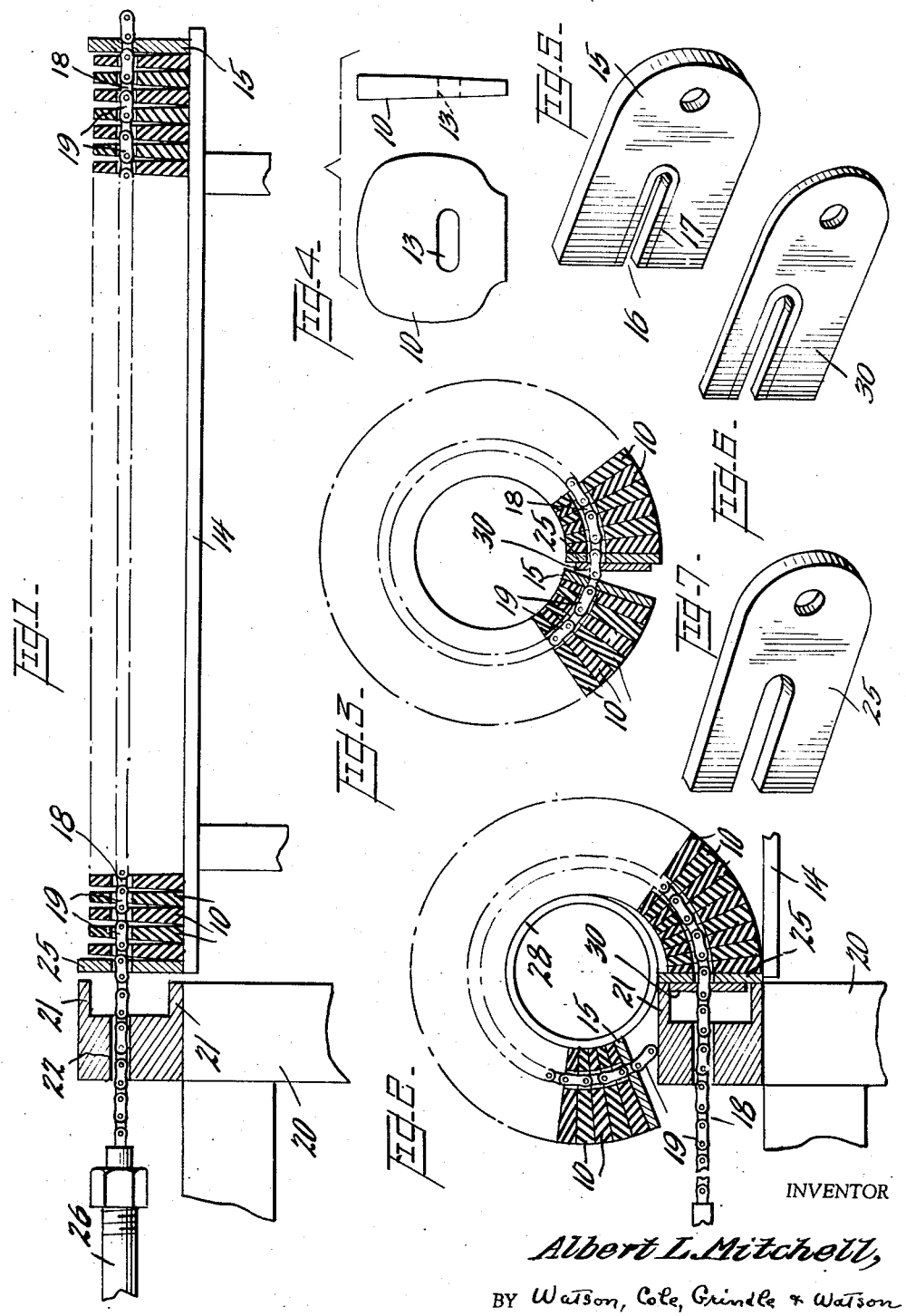

2,801,463

METHOD OF ASSEMBLING LAMINATED TIRES

Albert L. Mitchell, Lookout Mountain, Ga., assignor to Mitchell Industrial Tire Company, Inc., Chattanooga, Tenn., a corporation of Tennessee Application January 26, 1956, Serial No. 561,463

1 Claim. (Cl. 29—433)

This invention relates to the production of non-pneumatic vehicle tires of the type comprising a plurality of segments of resilient material such as rubber, preferably reinforced with fabric, secured together in face-to-face relation under compression to form a continuous annulus, and has for its object the provision of a new and improved method of assembling the component parts thereof.

Tires of the general character described are in widespread use, especially on industrial lift trucks, tractors, and various kinds of farming equipment on which pneumatic tires are not required, since they may be readily and cheaply produced by stamping the segments from the tread portions of discarded pneumatic tires. The segments, suitably apertured and shaped, are commonly secured together by threading the same on one or more tension members, such as steel rods or bands, compressing the segments, and joining the free ends of the rods or bands by welding or otherwise. The patent to Swafford 2,317,864, granted April 27, 1943, is typical of the numerous patents granted on tires of this character.

The problems encountered in the manufacture of these laminated tires arise out of the need for (1) application to the segments of sufficient compressive force in a circumferential direction to give adequate sturdiness to the annulus and (2) securing the ends of the tension member or members together in such a way that no weakness is developed. Both the welding of the ends and the method of securing the same disclosed by Swafford and others, involving the use of threaded elements, give rise to difficulty in applying the requisite compressive force and introduce weakness in the tensile member or members such as may cause mechanical failure.

It is, therefore, an object of the present invention to provide a method of assembling tires of the character indicated whereby adequate compressive force may be applied to the segments by the use of a tensile member which is of uniform strength throughout and is entirely continuous, thus avoiding the primary cause of failure in laminated tires heretofore produced.

Specifically, my invention contemplates the use as the tensile member of a chain of the link and pin or roller type, usually called a power transmission chain, such as is often employed in sprocket gearing. Chains of this character are commonly made with removable pivot pins or rollers, or are otherwise formed to permit the removal or addition of links for the purpose of shortening or lengthening the chain. Perforated wedge shaped resilient segments are assembled on the chain, a removable abutment is applied to the chain beyond one end of the segments, the remote segment and the remote end of the chain are relatively displaced lengthwise of the chain to apply pressure to the assembled segments, and a second abutment is interlocked with the chain beyond the remote segment, whereupon the excess chain at either end is removed and the free ends are joined. Upon withdrawal of the locking abutments from the chain, the segments expand sufficiently to provide a continuous annulus with the segments in a state of high circumferential compression. Since the chain is of uniform construction throughout its length and is continuous, the possibility of failure is minimized, while the difficulty of conducting a welding operation in the limited space available is avoided.

Further objects and features of the invention will be apparent from the following description taken in connection with the accompanying drawings, in which:

Figure 1 is a side elevation, partly in section, of apparatus useful in the practice of the invention, the resilient segments being shown in assembled relation on the chain prior to compression;

Figure 2 is a side elevation corresponding to Figure 1 in which the segments are shown after compression and locked against displacement in either direction on the chain;

Figure 3 is a side elevation showing the free ends of the chain brought together and united;

Figure 4 is a front and side elevation of a resilient segment;

Figures 5 and 6 are perspective views of removable locking abutments employed to grip the free ends of the chain to effect temporary retention of the compressed segments on the chain; and Figure 7 is a perspective view of a removable pressure plate for use in conjunction with apparatus shown in Figure 1.

To facilitate an understanding of the invention, reference is made herein to the apparatus and to the tire components illustrated in the drawing, and specific language is employed to describe the same. It will nevertheless be understood that no limitation of the scope of the invention is thereby intended, such further modifications, alterations and variants of both method and the apparatus employed in practicing the same being contemplated as would normally occur to those skilled in the art to which the invention relates.

The initial step in the practice of my improved method involves the threading of the apertured segments 10 on a transmission chain 12. The segments shown in the drawing have the external contour of the finished tire annulus and are wedge shaped or tapered, being assembled on the chain 12 in face-to-face relation with the narrower portions upward. Preferably the segments are formed of rubber and/or rubber reinforced with fabric, and each segment is provided with an aperture 13 of sufficient size to accommodate the chain 12 freely. The illustrated chain is of the so-called B-block type, but it will be appreciated that the invention may be practiced with the use of transmission chains of other types, so constructed as to facilitate removal of links, such as a detachable roller chain. It is preferred to use a chain in which the link elements are secured together by pins or rollers because of the ease with which such chains may be shortened and reunited. To facilitate threading the segments 10 on the chain 12, the assembly may be conducted on a stationary table 14 or the like of convenient height.

After the segments are threaded on the chain, a locking abutment 15 is applied to the chain at one end of the assembly, as shown in Figure 1. This abutment may comprise a plate having a slot 16 therein, the plate preferably being reinforced by the provision of a hardened U-shaped element 17 defining the walls of the slot and welded to the plate to give adequate strength and resistance to wear. The width of the slot 16 is such that the plate may be fitted snugly over a portion of the chain of reduced depth, for instance over the reduced portions of the links 19 or over an intervening block 18 of reduced thickness, so that after the abutment is applied in transverse position on the chain, displacement thereof lengthwise of the chain is prevented.

The next step in the practice of the invention involves the compression of the segments lengthwise of the chain, and this is achieved either by holding the remote end of the chain against displacement and applying pressure to the remote segment to force the same toward the locking abutment 15, or by holding the remote segment against displacement and pulling the remote end of the chain away from the assembly. This latter method is preferred and is illustrated in the drawing.

Thus a stationary standard 20 may be provided, having its upper end formed to provide flanges 21 extending toward the table 14 and the assembled segments thereon, and being apertured as indicated at 22 to permit free movement of the chain 12 therethrough. A pressure plate 25, slotted to allow the chain to pass freely therethrough, rests against the adjacent ends of the flanges 21 and resists displacement of the segments to the left as shown in Figure 1. A tension member 26, which may be connected to a hydraulic jack, is coupled to one end of the chain 12 beyond the standard 20, and serves to pull the chain through the standard, displacing the locking abutment 15 to the left in Figure 1 and applying compression lengthwise of the chain to the segments 10.

Since the segments are wedge shaped or tapered as hereinbefore described, the application of endwise pressure thereto causes them to assume the position in which they are shown in Figure 2. To insure that the segments will be properly aligned and that after compression the shape of the assembly will be generally circular, a cylindrical element 28 may be supported on the top of the standard 20 to serve as a core, the assembly wrapping itself around the core as shown in Figure 2. It will be appreciated that very heavy compression may be applied to the segments in this manner.

When the segments have been adequately compressed, a second locking abutment 30 is applied to the chain beyond the pressure plate 25, thereby retaining the segments in compressed relation on the chain, whereupon the tension applied by the member 26 may be relieved and the chain severed, for instance by withdrawal of a pin or roller, just beyond the locking abutment 30. It is desirable, of course, that any excess of chain beyond either of the locking abutments 15 or 30 be removed, only such protruding length of chain remaining as may be necessary to facilitate uniting the free ends. The assembly is then removed from the supporting table and standard, the core 28 is withdrawn, and the free ends of the chain are united by replacement of a pin, roller or the like. At this juncture, the assembly appears as shown in Figure 3. The locking abutments 15 and 30, and the plate 25 are then removed, this step being facilitated by the provision in each of these elements of an aperture for receiving a suitable tool, whereupon the compressed segments are allowed to expand to form the continuous annulus, with the segments still under substantial circumferential compression.

It will be appreciated that the instant method is applicable to the assembly of components of various types of tire of the class indicated. For instance, there may be inserted between adjacent resilient segments reinforcing and traction enhancing plates, as proposed in my copending application, Serial No. 408,495, filed February 5, 1954, now abandoned. Segments differing in character and contour from those illustrated may obviously be substituted, the details of the tire itself constituting no part of the instant invention and being capable of wide variation.

Having thus described the invention, what is claimed as new and desired to be secured by Letters Patent is:

In a method of assembling wedge shaped apertured segments of resilient material to form a non-pneumatic vehicle tire, the steps which comprise threading a plurality of segments on a power transmission chain having removable pivot pins in face-to-face relation with the narrower portions of the segments at one side of the chain, applying to said chain at one end of the threaded segments a removable abutment interlocked with the chain to prevent displacement in one direction of the segments on the chain, holding against displacement lengthwise of the chain that segment remote from the abutment, pulling the chain thorugh said remote fixed segment to compress the assembled segments, applying to said chain beyond and adjacent to the said remote segment a second removable abutment interlocked with the chain, removing excess links of the chain beyond said abutments, mechanically uniting the ends of the chain, and removing said abutments to allow the segments to expand to form a continuous annulus.

References Cited in the file of this patent

UNITED STATES PATENTS

| | | |
|---|---|---|
| 939,619 | Nelson | Nov. 9, 1909 |
| 2,704,102 | Starr et al. | Mar. 5, 1955 |